: US 11,486,596 B2
(12) United States Patent
Ohnishi

(10) Patent No.: US 11,486,596 B2
(45) Date of Patent: Nov. 1, 2022

(54) AIR CONDITIONER

(71) Applicant: Mitsubishi Electric Corporation, Tokyo (JP)

(72) Inventor: Takamasa Ohnishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 479 days.

(21) Appl. No.: 16/616,676

(22) PCT Filed: Jul. 26, 2017

(86) PCT No.: PCT/JP2017/027086
§ 371 (c)(1),
(2) Date: Nov. 25, 2019

(87) PCT Pub. No.: WO2019/021397
PCT Pub. Date: Jan. 31, 2019

(65) Prior Publication Data
US 2020/0200419 A1   Jun. 25, 2020

(51) Int. Cl.
*F24F 11/46* (2018.01)
*F24F 11/88* (2018.01)
(Continued)

(52) U.S. Cl.
CPC .............. *F24F 11/46* (2018.01); *F24F 11/88* (2018.01); *H02M 1/32* (2013.01); *H02M 7/53871* (2013.01)

(58) Field of Classification Search
CPC .......... F24F 11/46; F24F 11/88; F24F 1/0003; H02M 1/32; H02M 3/158; H02M 7/06; H02M 7/53871; H02M 1/0032; H02M 1/007; H02M 1/36; H02M 3/1584; Y02B 70/10
See application file for complete search history.

(56) References Cited

U.S. PATENT DOCUMENTS

2011/0202182 A1*  8/2011  Lee ......................... F24F 11/89
                                                               700/276

FOREIGN PATENT DOCUMENTS

| JP | 2004190889 A | * | 7/2004 |
| JP | 2014-152968 A |   | 8/2014 |
| JP | 2015148372 A | * | 8/2015 |

* cited by examiner

*Primary Examiner* — Thomas C Lee
*Assistant Examiner* — Anzuman Sharmin
(74) *Attorney, Agent, or Firm* — Posz Law Group, PLC

(57) ABSTRACT

An outdoor unit includes: first, second, third, and fourth connection terminals all of which are connected to an indoor unit; a power converter; and a switch unit provided between the first connection terminal and the power converter. The indoor unit includes: a first indoor unit terminal connected to the first connection terminal; a second indoor unit terminal connected to the second connection terminal; a third indoor unit terminal connected to the third connection terminal; a fourth indoor unit terminal connected to the fourth connection terminal; and a switch provided between the first indoor unit terminal and the fourth indoor unit terminal. The switch unit includes: a first switch that is closed when receiving power supply from the second and fourth connection terminals; and a second switch connected in parallel with the first switch. AC power is applied to the first and second connection terminals. The indoor unit closes the switch upon receiving a start signal, and the outdoor unit closes the second switch after supply of AC power to the power converter starts.

7 Claims, 5 Drawing Sheets

(51) Int. Cl.
*H02M 1/32* (2007.01)
*H02M 7/5387* (2007.01)
*H02M 1/00* (2006.01)
*H02M 1/36* (2007.01)
*H02M 3/158* (2006.01)
*H02M 7/06* (2006.01)
*F24F 1/0003* (2019.01)

AIR CONDITIONER

CROSS REFERENCE TO RELATED APPLICATION

This application is a U.S. national stage application of International Patent Application No. PCT/JP2017/027086 filed on Jul. 26, 2017, the disclosure of which is incorporated herein by reference.

TECHNICAL FIELD

The present invention relates to an air conditioner that includes a function of reducing power consumption during standby.

BACKGROUND

Patent Literature 1 describes a conventional air conditioner that can reduce power consumption during standby. For the air conditioner described in Patent Literature 1, an outdoor unit includes a switch for interrupting power supplied from a commercial power supply to the outdoor unit, so that no power is supplied from the commercial power supply to the outdoor unit during standby. When the outdoor unit is to start, the switch of the outdoor unit is controlled by an indoor unit so that the power is supplied to the outdoor unit. At this time, a switch within the indoor unit has changed its connection state such that a current passes through a coil in the switch of the outdoor unit to thereby close the switch.

PATENT LITERATURE

Patent Literature 1: Japanese Patent Application Laid-open No. 2014-152968

In the air conditioner described in Patent Literature 1, the indoor unit supplies the power for starting the outdoor unit, using a communication signal line provided for communication with the outdoor unit. Changing the connection state of the switch of the indoor unit determines whether the communication signal line is used for the purpose of communicating with the outdoor unit or for the purpose of supplying the power to the outdoor unit. The outdoor unit has a communication circuit always connected to the communication signal line. For this reason, an excessive voltage may be applied to the communication circuit of the outdoor unit when the connection state of the switch of the indoor unit is changed. It has thus been necessary to take measures to prevent the circuit from failing due to the application of such an excessive voltage. Specifically, measures such as adding a resistance element for limiting the current and using a high-voltage component have been required.

SUMMARY

The present invention has been made in view of the above, and an object of the present invention is to provide an air conditioner that can reduce the number of components used for measures against circuit failure.

In order to solve the above problem and achieve the object, the present invention provides an air conditioner comprising an indoor unit and an outdoor unit. The outdoor unit includes: a first connection terminal, a second connection terminal, a third connection terminal, and a fourth connection terminal that are connected to the indoor unit; a power converter; and a switch assembly provided between the first connection terminal and the power converter. The indoor unit includes: first, second, third, and fourth indoor unit terminals, the first indoor unit terminal being connected to the first connection terminal, the second indoor unit terminal being connected to the second connection terminal, the third indoor unit terminal being connected to the third connection terminal, and the fourth indoor unit terminal being connected to the fourth connection terminal; and a switch provided between the first indoor unit terminal and the fourth indoor unit terminal. The switch assembly includes: a first switch that is closed when receiving power supply from the second connection terminal and the fourth connection terminal; and a second switch connected in parallel with the first switch. AC power is applied to the first connection terminal and the second connection terminal, and the outdoor unit and the indoor unit communicate through a connecting cable that interconnects the third connection terminal and the third indoor unit terminal. The indoor unit closes the switch when receiving a start signal in a low standby power state that is a state in which the operation of the power converter stops, and the indoor unit opening the switch after the operation of the power converter starts, and the outdoor unit closes the second switch when the first switch is closed to start supply of AC power to the power converter.

The air conditioner according to the present invention has an effect of reducing the number of the components used for measures against the circuit failure.

DETAILED DESCRIPTION

An air conditioner according to an embodiment of the present invention will now be described in detail with reference to the drawings. Note that the present invention is not limited to the embodiment.

Embodiment

Figure 1:
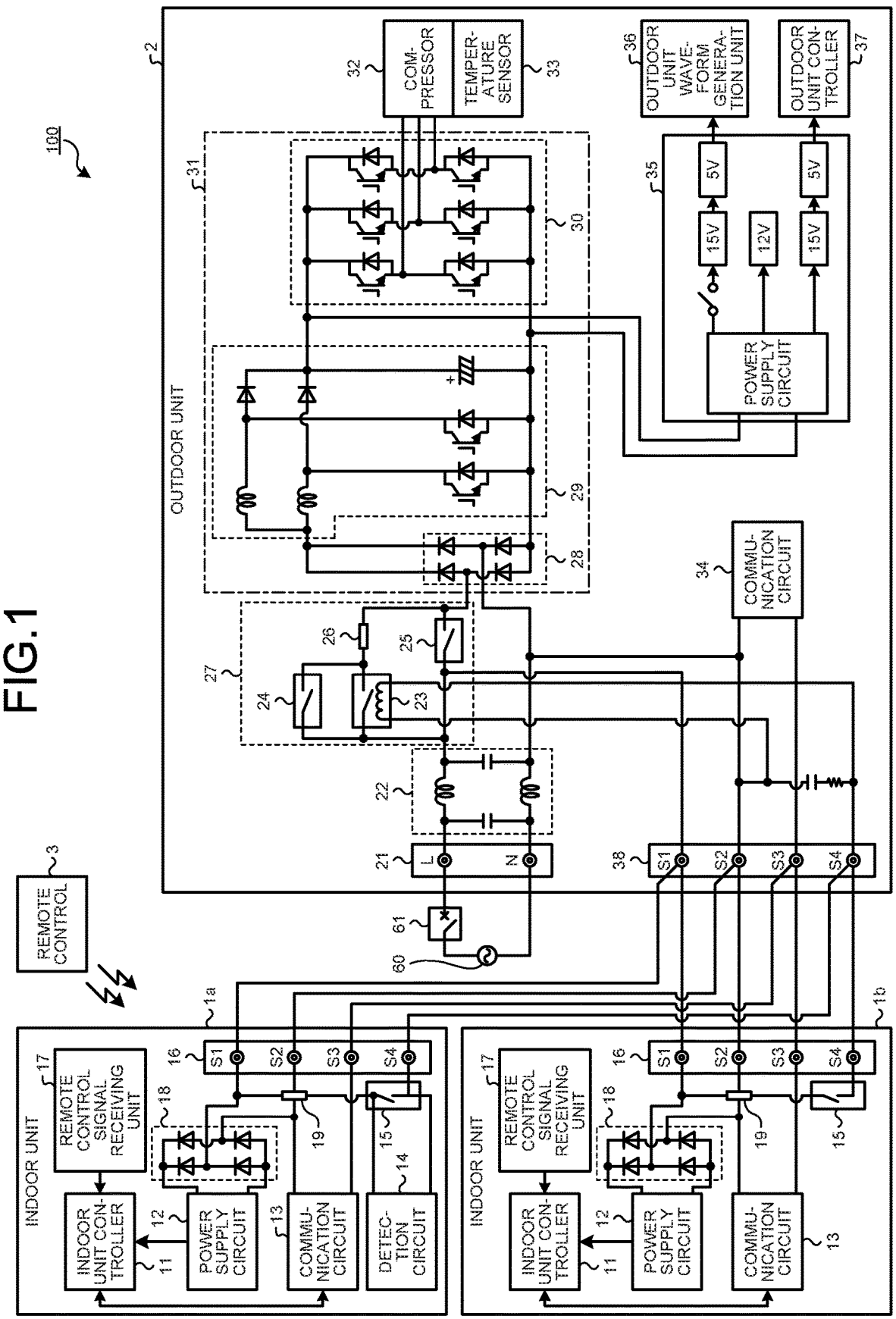
FIG. 1 is a diagram illustrating an example of the configuration of an air conditioner according to an embodiment of the present invention.

FIG. 1 is a diagram illustrating an example of the configuration of an air conditioner according to an embodiment of the present invention. An air conditioner 100 according to the embodiment includes indoor units 1a and 1b and an outdoor unit 2. The air conditioner 100 may include one or more indoor units although FIG. 1 illustrates the air conditioner 100 as including the two indoor units. Moreover, although an example in which the configuration of the indoor unit 1a is different from the configuration of the indoor unit 1b will be described, a plurality of the indoor units may all have the same configuration. That is, the air conditioner 100 may include a plurality of the indoor units 1a and a single outdoor unit 2, or a plurality of the indoor units 1b and a single outdoor unit 2. The outdoor unit 2 is connected to an AC power supply 60 through a breaker 61.

The indoor unit 1a includes an indoor unit controller 11, a power supply circuit 12, a communication circuit 13, a detection circuit 14, a switch 15, a wiring connector 16, a remote control signal receiving unit 17, a rectifier circuit 18, and an inrush current preventing element 19.

The indoor unit controller 11 controls each of elements that make up the indoor unit 1a. The elements to be controlled by the indoor unit controller 11 include the switch 15. The power supply circuit 12 generates control power supply for operating the indoor unit controller 11 and the communication circuit 13. The communication circuit 13 is a circuit for the indoor unit 1a to communicate with the outdoor unit 2.

The switch 15 is provided for starting the outdoor unit 2. The switch 15 is closed when starting the outdoor unit 2 and is opened in other situations. That is, in the air conditioner 100 according to the present embodiment, the starting power is supplied from the indoor unit 1a to the outdoor unit 2 when the switch 15 is closed.

Figure 2:
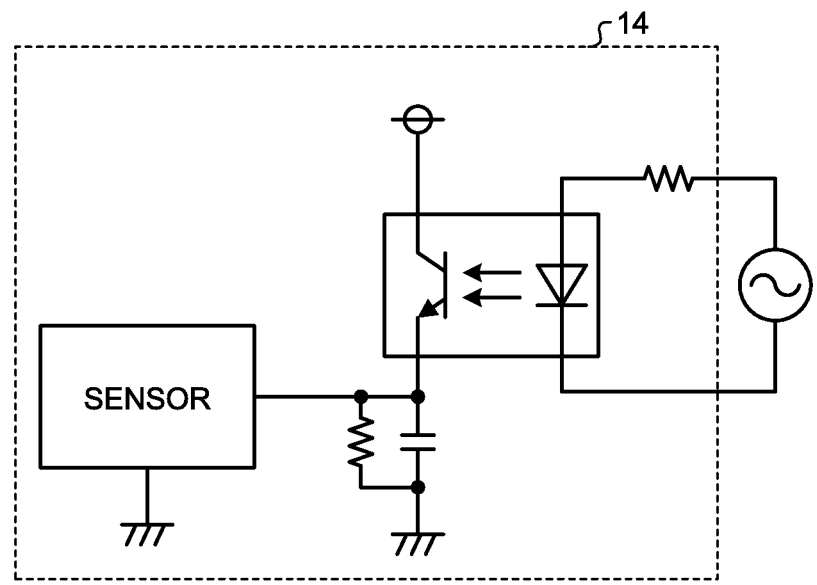
FIG. 2 is a diagram illustrating an example of the configuration of a detection circuit of an indoor unit.
Figure 3:
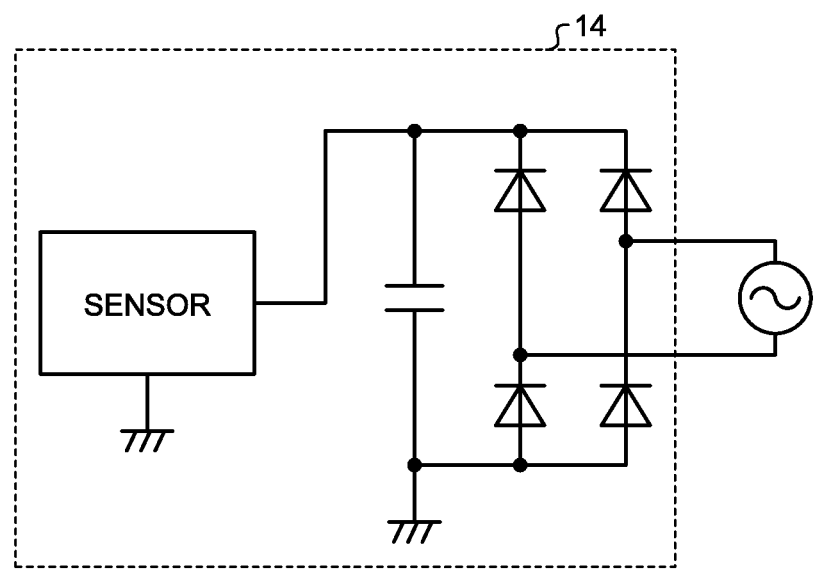
FIG. 3 is a diagram illustrating another example of the configuration of the detection circuit of the indoor unit.

The detection circuit 14 is a circuit for detecting that the switch 15 is operated. The detection circuit 14 can have a path configured as illustrated in FIG. 2 or 3. For the detection circuit 14 configured as illustrated in FIG. 2, a detector acquires a pulse waveform after half-wave rectification. That is, the detector detects the pulse waveform when the switch 15 is closed. For the detection circuit 14 configured as illustrated in FIG. 3, the sensor acquires a DC voltage after full-wave rectification. That is, the detector detects a non-zero DC voltage when the switch 15 is closed. Although the detection circuit 14 is not essential and thus can be omitted, providing the indoor unit controller 11 with the detection circuit 14 allows the indoor unit controller 11 to identify whether or not the switch 15 is operated normally under the control of the indoor unit controller 11.

The wiring connector 16 includes terminals S1 to S4 for interconnecting cables that electrically connect the indoor unit 1a and the outdoor unit 2 to each other. The switch 15 described above is provided between the terminal S1 and the terminal S4 of the wiring connector 16, and is controlled by the indoor unit controller 11 such that the switch 15 short-circuits the terminal S1 and the terminal S4 in starting the outdoor unit 2. Moreover, the communication circuit 13 described above is connected to the terminal S2 and the terminal S3 of the wiring connector 16. Here, the terminal S1 is a first indoor unit terminal, the terminal S2 is a second indoor unit terminal, the terminal S3 is a third indoor unit terminal, and the terminal S4 is a fourth indoor unit terminal. The remote control signal receiving unit 17 is a circuit for receiving a signal transmitted from a remote control 3. The rectifier circuit 18 converts, into DC power, AC power supplied from the AC power supply 60 via the outdoor unit 2.

The inrush current preventing element 19 is a resistor and is connected in series to the switch 15. Specifically, the inrush current preventing element 19 has its one end connected to the switch 15, and an opposite end connected to the terminal S1 of the wiring connector 16. The inrush current preventing element 19 is provided to suppress an inrush current flowing in the circuit when the switch 15 is closed.

The indoor unit 1b has a configuration that does not include the detection circuit 14 of the indoor unit 1a, and each component of the indoor unit 1b is designated by the same reference numeral as the corresponding component of the indoor unit 1a. For this reason, description of the details of the indoor unit 1b is omitted.

The outdoor unit 2 includes a power supply connector 21, a filter circuit 22, switches 23 to 25, an inrush current preventing element 26, a rectifier circuit 28, a booster circuit 29, an inverter circuit 30, a compressor 32, a temperature sensor 33, a communication circuit 34, a power supply generation unit 35, an outdoor unit waveform generation unit 36, an outdoor unit controller 37, and a wiring connector 38. The switches 23 to 25 and the inrush current preventing element 26 make up a switch assembly 27 that opens and closes a power supply path to the rectifier circuit 28. The rectifier circuit 28, the booster circuit 29, and the inverter circuit 30 form a power converter 31 that generates drive power for the compressor 32. The switch 23 is a first switch, the switch 24 is a second switch, and the switch 25 is a third switch.

The power supply connector 21 includes two terminals L and N that are connected to the AC power supply 60. The terminal L is a first power supply terminal, and the terminal N is a second power supply terminal. The filter circuit 22 removes a noise component propagating through a power line that interconnects the AC power supply 60 and the outdoor unit 2. Note that the filter circuit 22 may be omitted when the noise component propagating through the power line is small, that is, when the noise component is at a level that does not adversely affect the operation of the air conditioner 100 and the operation of another device connected to the AC power supply 60.

The switches 23 to 25 are provided for reducing power consumption of the outdoor unit 2 during standby. The switches 23 to 25 are connected in parallel. One end of each of the switches 23 to 25 is connected to the terminal L of the power supply connector 21 via the filter circuit 22. An opposite end of each of the switches 23 and 24 is connected to one end of the inrush current preventing element 26 defined by a resistor. An opposite end of the inrush current preventing element 26 and an opposite end of the switch 25 are connected to one of two input terminals of the rectifier circuit 28. An initial state of the switches 23 to 25 is an opened state. Here, the switch 25 is a mechanical switch in which a contact is closed by magnetic force generated by an internal coil when a current passes through the coil upon receiving AC power. The switches 23 and 24 may each be a mechanical switch or a switch of another type. Note that in the example of configuration illustrated in FIG. 1, the switch unit 27, which is made up of the switches 23 to 25 and the inrush current preventing element 26, is disposed on the power supply path on the side of the terminal L, but the switch unit 27 may be disposed on the power supply path on the side of the terminal N.

The rectifier circuit 28 converts, into DC power, AC power supplied from the AC power supply 60 and outputs the DC power. The rectifier circuit 28 has its output side connected to the booster circuit 29. The booster circuit 29 has its output side connected to the inverter circuit 30 and the power supply generation unit 35.

The booster circuit 29 boosts the DC power output from the rectifier circuit 28, and supplies the boosted DC power to the inverter circuit 30 and the power supply generation unit 35. The inverter circuit 30 has its output side connected to the compressor 32. The inverter circuit 30 converts the DC voltage input from the booster circuit 29, into AC and generates the drive power for the compressor 32. Note that the booster circuit 29 is not essential and can be omitted.

The compressor 32 includes a motor (not shown) to drive the motor with the power supplied from the inverter circuit 30 and compress a refrigerant flowing through refrigerant piping (not shown). The temperature sensor 33 detects the temperature of the compressor 32.

The communication circuit 34 communicates with the communication circuits 13 of the indoor units 1a and 1b. The power supply generation unit 35 converts the DC voltage input from the booster circuit 29 and generates control power supply for operating the outdoor unit waveform generation unit 36 and the outdoor unit controller 37. The power supply generation unit 35 also generates control power supply for operating the communication circuit 34. The outdoor unit waveform generation unit 36 generates a pulse width modulation (PWM) signal for controlling switching elements of the inverter circuit 30. The outdoor unit controller 37 controls the switches 24 and 25.

The wiring connector 38 includes the terminals S1 to S4. These terminals S1 to S4 are connected to cables for electrically connecting the outdoor unit 2 and the indoor units 1a and 1b to each other. The terminal S1 of the wiring connector 38 is a first connection terminal, and is connected to the terminal S1 of the wiring connector 16 of each of the indoor units 1a and 1b via the cable. The terminal S2 of the wiring connector 38 is a second connection terminal, and is connected to the terminal S2 of the wiring connector 16 of each of the indoor units 1a and 1b via the cable. The terminal S3 of the wiring connector 38 is a third connection terminal, and is connected to the terminal S3 of the wiring connector 16 of each of the indoor units 1a and 1b via the cable. The terminal S4 of the wiring connector 38 is a fourth connection terminal, and is connected to the terminal S4 of the wiring connector 16 of each of the indoor units 1a and 1b via the cable. Moreover, the terminal S1 of the wiring connector 38 is connected to the terminal L of the power supply connector 21, and the terminal S2 of the wiring connector 38 is connected to the terminal N of the power supply connector 21. Therefore, the AC power from the AC power supply 60 is applied to the terminals S1 and S2. The AC power supplied from the AC power supply 60 to the outdoor unit 2 is supplied to the indoor units 1a and 1b via the terminals S1 and S2 of the wiring connector 38. The communication circuit 34 is connected to the terminals S2 and S3 of the wiring connector 38. Moreover, an internal coil of the switch 23 is connected between the terminal S2 and the terminal S4 of the wiring connector 38.

Figure 4:
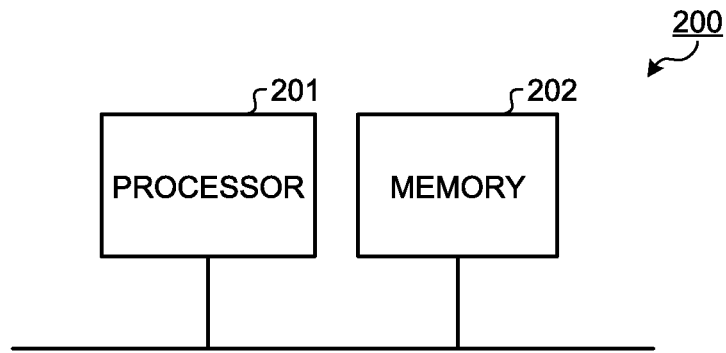
FIG. 4 is a diagram illustrating hardware that implements an indoor unit controller of the indoor unit.

Hardware for implementing the indoor unit controller 11 of each of the indoor units 1a and 1b illustrated in FIG. 1 will be described. The indoor unit controller 11 of each of the indoor units 1a and 1b can be implemented by a control circuit 200 illustrated in FIG. 4, specifically, a processor 201 and a memory 202.

The processor 201 is a central processing unit (CPU), which is also referred to as a central processor, a processing unit, an arithmetic unit, a microprocessor, a microcomputer, a processor, or a digital signal processor (DSP). The memory 202 includes, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), or a magnetic disk.

The indoor unit controller 11 is implemented by the memory 202 holding a program in which processing executed by the indoor unit controller 11 is described, and the processor 201 reading and executing the program. Note that the indoor unit controller 11 may be implemented by a processing circuit as dedicated hardware. In this case, the processing circuit corresponds to a single circuit, a complex circuit, a programmed processor, a parallel-programmed processor, an application specific integrated circuit (ASIC), a field programmable gate array (FPGA), or a combination of those.

The outdoor unit waveform generation unit 36 and the outdoor unit controller 37 of the outdoor unit 2 illustrated in FIG. 1 can also be implemented by hardware similar to that of the indoor unit controller 11.

For the air conditioner 100 according to the present embodiment illustrated in FIG. 1, the switches 24 and 25 of the outdoor unit 2 are opened when the operation of the air conditioner stops, such that the outdoor unit 2 shifts to a low standby power state. The low standby power state refers to a state in which the operation of the power converter 31 stops without power being supplied to the rectifier circuit 28 of the outdoor unit 2, such that power consumption is kept low. For the air conditioner 100, also, the switch 15 of the indoor unit 1a is closed when the outdoor unit 2 is in the low standby power state, such that the outdoor unit 2 recovers from the low standby power state.

Next, a description will be made as to operations of the air conditioner 100: an operation for starting the outdoor unit 2, that is, an operation for recovery of the outdoor unit 2 from the low standby power state; and an operation for shifting the outdoor unit 2 from the operating state to the low standby power state.

(Operation for Recovery of Outdoor Unit 2 from Low Standby Power State)

Figure 5:
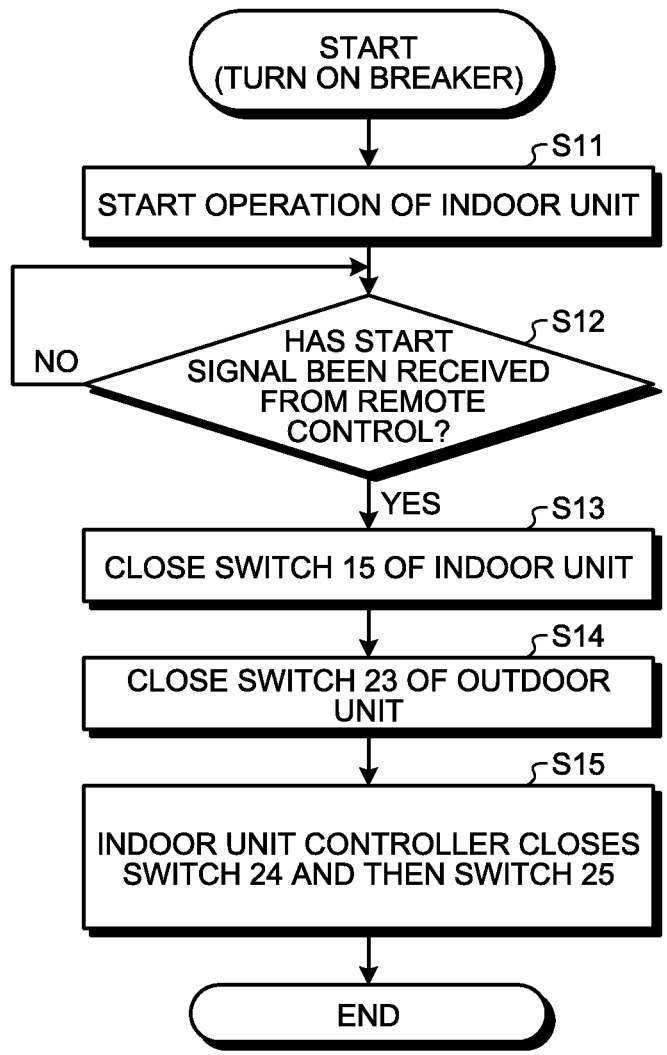
FIG. 5 is a flowchart illustrating an example of an operation for recovery of an outdoor unit from a low standby power state.

First, the operation when the outdoor unit 2 recovers from the low standby power state will be described with reference to FIG. 5. FIG. 5 is a flowchart illustrating an example of the operation for recovery of the outdoor unit 2 of the air conditioner 100 from the low standby power state.

The operation illustrated in FIG. 5 commences when the breaker 61 connected to the outdoor unit 2 is turned on and power is supplied from the AC power supply 60 to the outdoor unit 2.

Once the breaker 61 is turned on, supply of power from the AC power supply 60 to the indoor units 1a and 1b starts. Specifically, power is supplied from the AC power supply 60 to the indoor units 1a and 1b via the power supply connector 21 and the terminals S1 and S2 of the wiring connector 38 of the outdoor unit 2. Upon the start of supply of power to the indoor units 1a and 1b, the rectifier circuits 18 convert alternating current into direct current, and the power supply circuits 12 generate control power supply and supply the power supply to the indoor unit controllers 11 and the communication circuits 13. When the indoor units 1a and 1b start their operations with the indoor unit controllers 11 and the communication circuits 13 receiving the power supply from the power supply circuits 12 (step S11), the air conditioner 100 enters a standby state. Note that the switches 23, 24, and 25 of the outdoor unit 2 are still opened at the time the breaker 61 is turned on; as a result, power is not supplied to the rectifier circuit 28 of the outdoor unit 2. That is, the outdoor unit 2 is in the low standby power state.

The indoor units 1a and 1b check whether or not a start signal has been received from the remote control 3 after starting the operations (step S12). The start signal here is a signal that instructs the air conditioner 100 to start. The remote control 3 transmits the start signal, for example, when receiving a user's manipulation for starting the operation.

The indoor units 1a and 1b repeat step S12 if having not received the start signal (No in step S12). In the indoor units 1a and 1b, the remote control signal receiving units 17 receive the signal transmitted from the remote control 3, and the indoor unit controllers 11 determine whether or not the signal received by the remote control signal receiving units 17 is the start signal.

If having received the start signal (Yes in step S12), the indoor units 1a and 1b close the switches 15 (step S13) and close the switch 23 of the outdoor unit 2 (step S14). That is, when the switches 15 are closed, the terminals S1 and S4 of the wiring connectors 16 are short-circuited. This allows a current to pass through the coil inside the switch 23 of the outdoor unit 2, so that the contact of the switch 23 is operated to close the switch 23. The indoor unit controllers 11 perform the operation of closing the switches 15.

When the switch 23 is closed, the power from the AC power supply 60 is supplied to the rectifier circuit 28 via the switch 23 and the inrush current preventing element 26. Then, the power converted into direct current by the rectifier circuit 28 is supplied to the inverter circuit 30 and the power supply generation unit 35 via the booster circuit 29. As a result, the power supply generation unit 35 starts generating the control power supply, and the outdoor unit waveform generation unit 36, the outdoor unit controller 37, and the communication circuit 34 start the operation upon receiving the control power supply generated by the power supply generation unit 35.

Upon starting the operation, the outdoor unit controller 37 first closes the switch 24 and then closes the switch 25 (step S15). The reason for operating the switches 24 and 25 in this order is that closing the switch 24 first allows the inrush current preventing element 26 connected in series with the switch 24 to suppress the inrush current flowing into the rectifier circuit 28 at the start of power supply. When the switch 25 is closed thereafter, the power is supplied to the rectifier circuit 28 without passing through the inrush current preventing element 26, thereby preventing wasteful consumption of power from taking place at the inrush current preventing element 26.

The outdoor unit controller 37 also generates a signal indicating that the power converter 31 has started its operation to thereby start the outdoor unit 2, and transmits the signal to the indoor units 1a and 1b via the communication circuit 34.

The signal indicating that the outdoor unit 2 has started is received by the communication circuits 13 of the indoor units 1a and 1b and passed to the indoor unit controllers 11. Upon receiving the signal indicating that the outdoor unit 2 has started, the indoor unit controllers 11 open the switches 15. Note that among the indoor unit controllers 11 of the indoor units 1a and 1b, the indoor unit controller 11 having closed the switch 15 in response to the reception of the start signal from the remote control 3 opens the switch 15. The other indoor unit controller 11 does nothing even when receiving the signal indicating that the outdoor unit 2 has started. When the switch 15 is opened, the terminals S1 and S4 of the wiring connector 16 are brought out of the short-circuited state. As a result, the current no longer passes through the coil inside the switch 23 of the outdoor unit 2, whereby the switch 23 is opened.

Although the description has been made as to the case where the outdoor unit 2 in the low standby power state recovers by the indoor unit 1a or 1b receiving the start signal, the outdoor unit 2 may also recover from the low standby power state when a certain period of time (such as 30 minutes) has elapsed since the shift to the low standby power state.

(Operation for Shifting Outdoor Unit 2 from Operating State to Low Standby Power State)

Figure 6:
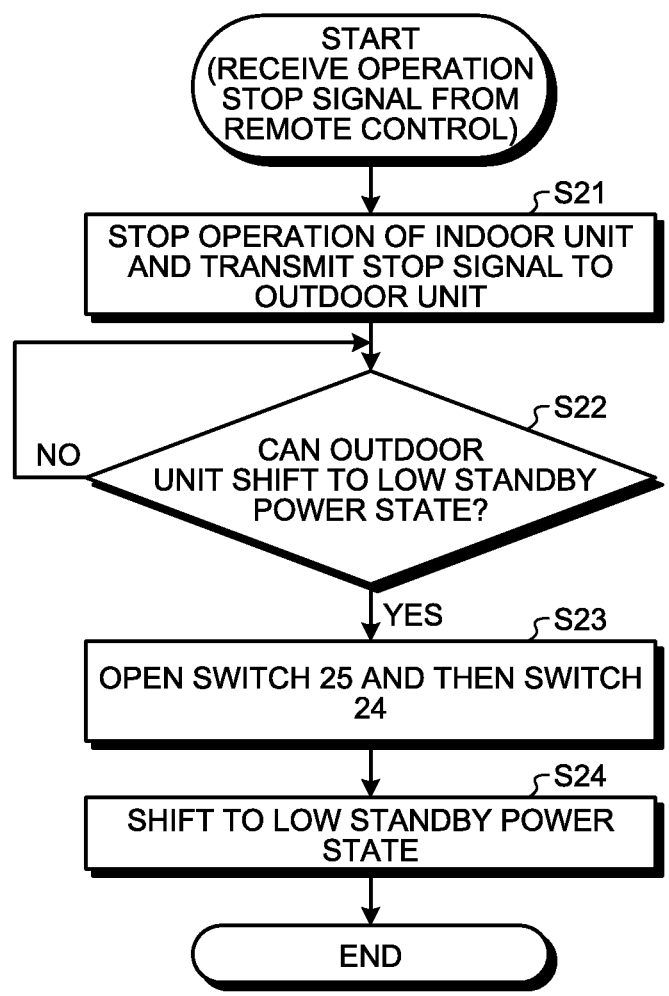
FIG. 6 is a flowchart illustrating an example of an operation for shifting the outdoor unit from an operating state to the low standby power state.

Next, the operation for shifting the outdoor unit 2 from the operating state to the low standby power state will be described with reference to FIG. 6. FIG. 6 is a flowchart illustrating an example of the operation for shifting the outdoor unit 2 of the air conditioner 100 from the operating state to the low standby power state.

The operation illustrated in FIG. 6 commences when the indoor unit 1a or 1b receives an operation stop signal from the remote control 3 while the air conditioner 100 is in operation. Note that the remote control 3 transmits the operation stop signal, for example, when receiving a user's manipulation for stopping the operation.

Upon receiving the operation stop signal, the indoor unit 1a or 1b stops an air conditioning operation and transmits a stop signal to the outdoor unit 2 (step S21). The air conditioning operation is an operation directly related to air conditioning such as an air blowing operation or a wind direction adjustment operation, and does not include, for example, an operation in which the communication circuit 13 communicates with the outdoor unit 2, or an operation in which the remote control signal receiving unit 17 receives a signal from the remote control 3. In the indoor unit 1a or 1b, when the remote control signal receiving unit 17 receives the operation stop signal, the indoor unit controller 11 stops the air conditioning operation and further generates and transmits the stop signal to the outdoor unit 2 via the communication circuit 13.

When receiving the stop signal transmitted from the indoor unit 1a or 1b in step S21, the outdoor unit 2 checks whether or not the outdoor unit 2 can shift to the low standby power state (step S22). The outdoor unit controller 37 determines whether or not the outdoor unit 2 can shift to the low standby power state. The outdoor unit controller 37 determines that the outdoor unit can shift to the low standby power state when a certain condition is satisfied. On the basis of, for example, the state of the indoor units 1a and 1b, the prediction of a change in the outside air temperature, and a compressor temperature that is the temperature detected by the temperature sensor 33 of the outdoor unit 2, the outdoor unit controller 37 determines whether or not the outdoor unit can shift to the low standby power state. Specifically, the outdoor unit controller 37 considers the outdoor unit as being shiftable to the low standby power state, when the outdoor unit controller 37 determines, on the basis of the prediction of the change in the outside air temperature and the compressor temperature, that a preheating operation of the compressor 32 is not required as the air conditioning operation of all the indoor units 1a and 1b stops. The preheating operation of the compressor 32 is an operation of adjusting the temperature of the compressor 32 by allowing the coil of the motor of the compressor 32 to generate heat with a current flowing therethrough.

If the outdoor unit 2 is unable to shift to the low standby power state (No in step S22), the outdoor unit 2 repeats the checking processing until the outdoor unit 2 becomes shiftable to the low standby power state. If the outdoor unit 2 can shift to the low standby power state (Yes in step S22), the outdoor unit 2 opens the switches 24 and 25 in reverse order to the recovery from the low standby power state. That is, the outdoor unit controller 37 first opens the switch 25 and then opens the switch 24 (step S23). As a result, the outdoor unit 2 shifts to the low standby power state (step S24).

Thus, the air conditioner 100 according to the present embodiment has the outdoor unit 2 and the indoor units 1a and 1b connected to each other through four connecting cables. Of these four connecting cables, a first connecting cable and a second connecting cable are used for supply of power from the outdoor unit 2 to the indoor units 1a and 1b. A fourth connecting cable is used such that the indoor units 1a and 1b operate the switches for starting the outdoor unit 2. Moreover, via a third connecting cable, the outdoor unit 2 communicate with the indoor units 1a and 1b. Such a configuration makes it unnecessary for a switch to determine to which point the connecting cable for communication should be connected, thereby preventing an excessive voltage from being applied to the circuit for communication. This means that there is no need to add an element for preventing a failure caused by an excessive voltage applied to the circuit for communication. As a result, the function of reducing power consumption during standby can be achieved at low cost. Because noise generated when operating the switch does not flow to the connecting cable for communication, the communication quality between the outdoor unit 2 and the indoor units 1a and 1b does not deteriorate due to the noise and the cable for communication can be extended.

Figure 7:
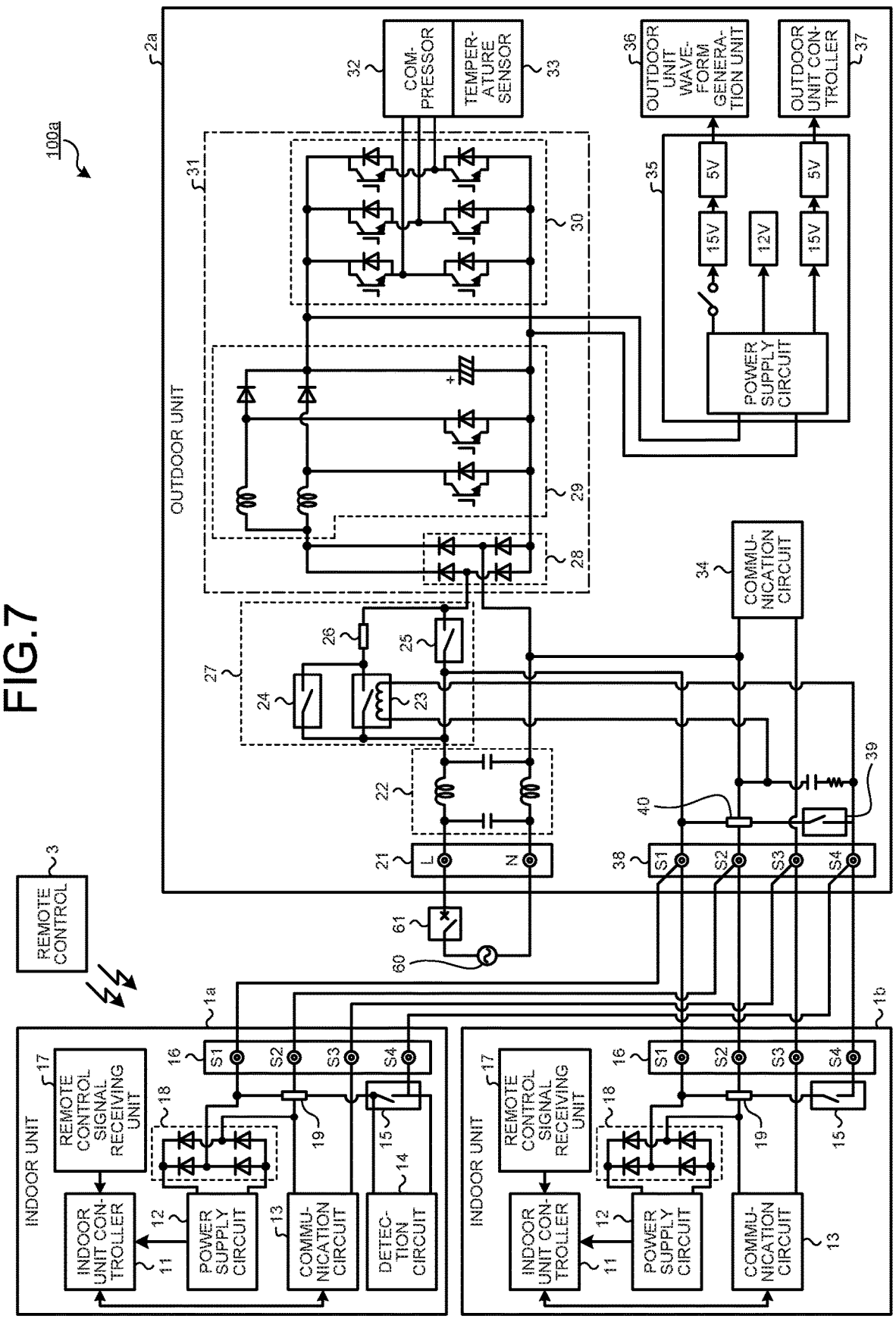
FIG. 7 is a diagram illustrating another example of the configuration of an air conditioner according to an embodiment of the present invention.

Note that the outdoor unit of the air conditioner configured as illustrated in FIG. 7 provides a similar effect. FIG. 7 is a diagram illustrating another example of the configuration of an air conditioner according to an embodiment of the present invention.

An air conditioner 100a illustrated in FIG. 7 is the air conditioner 100 illustrated in FIG. 1 with the outdoor unit 2 replaced with an outdoor unit 2a. The outdoor unit 2a is the outdoor unit 2 with a switch 39 and an inrush current preventing element 40 added. The switch 39 and the inrush current preventing element 40 are connected in series, and are provided between the terminal S1 and the terminal S4 of the wiring connector 38. Specifically, one end of the switch 39 is connected to the terminal S4, and an opposite end of the switch 39 is connected to one end of the inrush current preventing element 40. An opposite end of the inrush current preventing element 40 is connected to the terminal S1. The switch 39 is a fourth switch of the outdoor unit 2a. Since the configuration of the outdoor unit 2a is similar to that of the outdoor unit 2 except for the switch 39 and the inrush current preventing element 40, the description of the similar configuration is omitted.

In the air conditioner 100a, the outdoor unit 2a can use the switch 39 to notify the indoor unit 1a of a shift of the outdoor unit 2 to the low standby power state. For example, the outdoor unit controller 37 starts the operation to close the switches 24 and 25, and subsequently closes the switch 39. In shifting to the low standby power state, the outdoor unit controller 37 opens the switch 39 as well as the switches 24 and 25. The indoor unit 1a may use the detection circuit 14 for identifying the state of the switch 39 so as to detect that the outdoor unit 2a has shifted to the low standby power state.

The configuration illustrated in the above embodiment merely illustrates an example of the content of the present invention, and can thus be combined with another known technique or partially omitted and/or modified without departing from the scope of the present invention.

The invention claimed is:

1. An air conditioner comprising an indoor unit and an outdoor unit, wherein
the outdoor unit includes:
a first connection terminal, a second connection terminal, a third connection terminal, and a fourth connection terminal that are connected to the indoor unit;
a power converter; and
a switch assembly provided between the first connection terminal and the power converter,
the indoor unit includes: first, second, third, and fourth indoor unit terminals, the first indoor unit terminal being connected to the first connection terminal, the second indoor unit terminal being connected to the second connection terminal, the third indoor unit terminal being connected to the third connection terminal, and the fourth indoor unit terminal being connected to the fourth connection terminal; and
a switch provided between the first indoor unit terminal and the fourth indoor unit terminal,
the switch assembly includes:
a first switch that is closed when receiving power supply from the second connection terminal and the fourth connection terminal; and
a second switch connected in parallel with the first switch,
AC power is applied to the first connection terminal and the second connection terminal,
the outdoor unit and the indoor unit communicate through a connecting cable that interconnects the third connection terminal and the third indoor unit terminal,
the indoor unit closes the switch when receiving a start signal in a low standby power state that is a state in which the operation of the power converter stops, and the indoor unit opening the switch after the operation of the power converter starts, and
the outdoor unit closes the second switch when the first switch is closed to start supply of AC power to the power converter.

2. The air conditioner according to claim 1, wherein
the outdoor unit closes the second switch that is opened, and then transmits, to the indoor unit, a signal indicating that the operation of the power converter starts, and
the indoor unit opens the switch of the indoor unit upon receiving the signal indicating that the operation of the power converter starts.

3. The air conditioner according to claim 1, wherein
the outdoor unit opens the second switch and shifts to the low standby power state when a certain condition is satisfied.

4. The air conditioner according to claim 1, wherein
the switch assembly includes:
an inrush current preventing element having one end connected to the first switch and the second switch, and an opposite end connected to the power converter; and
a third switch connected in parallel with the first switch, the second switch, and the inrush current preventing element, and
the outdoor unit
closes the third switch after closing the second switch.

5. The air conditioner according to claim 4, wherein
the outdoor unit
opens the third switch first and then opens the second switch, when opening the second switch.

6. The air conditioner according to claim 1, wherein
the outdoor unit:
includes a fourth switch provided between the first connection terminal and the fourth connection terminal; and
notifies the indoor unit of a shift of the outdoor unit to the low standby power state by switching between a state of the fourth switch when the outdoor unit is in the low standby power state and a state of the fourth switch when the outdoor unit is not in the low standby power state.

7. The air conditioner according to claim 1, wherein the indoor unit is plural in number, the plurality of the indoor units is connected to the outdoor unit.

\* \* \* \* \*